(12) United States Patent
Prettyman

(10) Patent No.: X9127
(45) Date of Patent: Sep. 26, 1835

(54) BEDSTEADS

(76) Inventor: Perry Prettyman

Perry Prettyman, of George Town, Delaware Impt on his Bedsted of Mar 31. 1834
Letters Patent The Schedule referred to in these Letters Patent and making part of the same, containing a description in the words of the said Perry Prettyman himself of his improvement on his Bedstead patented March 31. 1834.

---

To all to whom these presents shall come. Be it known that I Perry Prettyman of George Town in the County of Sussex and State of Delaware have invented a new and useful improvement in bedsteads, and that the following is a full and exact description of the construction and operation of the said improvement as invented by me: My improvement consists in the manner of fastening or confining the rails by a catch and pin instead of screws or straps. After having constructed the bedstead (whether high, low or field post) in the ordinary way, that is with short tenons which should be one inch thick and from 1/2 inch to 3/4 long on the ends of the rails, having corresponding mortises in the posts. The upper side or edge of each tenon is then to be notched down about 3/4 of an inch so as to permit the rail when the tenon is entered to be raised by the hand 1/2 an inch or more. A shallow notch 1/4 of an inch or more is also to be made in the lower edge of the tenons to allow the rails to settle down as time or wear of the bedstead may require. Next a hole is to be bored in each of the tenons of about the same size depth and direction as those made to receive the screws in common use for bed steads, or it may if desired be made larger and deeper according to the size of the square shank of the catch which it is intended to receive and fit tight; this catch is simply a square piece of wrought or cast iron from 1/2 in. to 3/4 of an inch broad, 1/2 inch thick or larger or smaller and about 5 inches long resembling the catch to a common thumb latch of a door; except that the shank is of even thickness and the inner shoulder instead of being square stands oblique to and from the shank about 1/2 inch or 5/8 of an inch long forming the bearing of the rail as will be herein after seen. The extremity of the shank of the catch which enters the rail is furnished with a hole about 3 inches from the shoulder of the catch for securing the catch by the passing of a strong round wrought iron pin 1/4 of an inch thick passing through it and the rail. The manner of fixing the catches in the rails is as follows; the hole in the tenons being bored for the shank of the catch, there is also a 3/4 inch hole to be bored on the outside of the rail two inches from the shoulder of the rail to the centre of the hole,
to reach the hole where the shank is to be driven in the shank of the catch is now to be,
driven in with the catch down and within a short distance of their oblique shoulder,
the hole in the shank now being seen in the hole on the outside of the rail, a boring
bit suiting the hole in the shank is to be passed through the shank and through the
rail, the large hole first made on the outside of the rail is then to be firmly closed
by a solid wooden pin and a hole bored through it with the bit last used from the
reverse side of the rail, after which the iron pin is driven through from the outside
of the rail - and the catch is secured; there may be other methods used to bore then
holes but that here described will enable expert workmen to perform the operation quickly
and correctly. The mortisses of the posts are made three inches & 3/8 long and gaged
7/8 of an inch from the outside of the posts, and one inch wide, the mortice is cut 3/4
of an inch deep the part that is inch wide, then in the center of the inch mortice is
to be a half inch mortice or larger if required cut so as to receive the head of the catch
nearly one inch deep. next thare is to be a 3/8 inch hole bored from the inside of the post
across the mortice, within a quarter of an inch of the outside of the post one inch from
the edge of the post to the centre of the hole and one inch and 3/16th from the bottom or
lower edge of said mortice, then thare is to be a 3/8ths round wrought iron pin from two
1/4. to two & 1/2 inches long or longer if required which is simply a piece of 3/8 chain rod
cut off to be driven in the hole across the mortice to within about a 1/4 of an inch of
the outside of the post, then a wooden pin is to be driven in the hole on the iron pin to
prevent it from moving and this makes a firm fastening for the catch when the tenon
is put in the mortise; for large high post bedsteads the best method is to put in two
catches in the side rails, one even with the top edge of the tenon and the other near
the bottom edge of the tenon; that is let the point of the catch come even with the bottom
edge of the tenons, and put two iron pins across the mortices instead of one: one is
amply sufficient for low posts and field posts; but it is best to have two for high
posts, but one will do very well to put two pins across the mortices they are to be
put the same distance from the inside of the post as before described and one is to
be put in 1/2 inch from the lower edge of the mortice, to the centre of the hole, and the
other is to be put in one inch and 1/4 from the top edge of the mortise to the centre
of the hole, the wood behind the pin being sufficiently removed before the pin is
driven in, to permit the catch to enter over the pin and take hold and to allow a small space below the point of the catch for the further depression of the catch by wear and use, and the projection of the shoulder of the catch beyond the tenon, must be such that when the shoulder of the rail is close up or home to the post between the middle, and the point of the oblique shoulder of the catch bears on the inside of the pin; by this arrangement the shoulders of the rails are drawn into close connection with their respective posts & with a force proportionable to the incumbent weight — —

To put this bedstead up it is only necessary to enter the tenons high as the mortise will admit, in which position the catch will pass over the pin in the botom of the mortice and by then letting the rail down the oblique side of the catch takes hold on the inside of the pin and the work is done. By reversing the operation it may be taken down with equal facility and dispatch both operations being performed by the hands without tools —

Now what I claim as my invention and for which I ask Letters Patent is the pins across the mortises of the posts and the pin through the rails and catches —

In testimony that the foregoing is a true specification of my said invention and improvement I have hereunto subscribed my name this fourteenth day of September 1835.

Witnesses,
Wm. P. Elliot
Clement T. Coote

Perry Prettyman (Patented March 31. 1834
Reissued September 2d. 1835)

(Drawing)